(12) United States Patent
Kozlov et al.

(10) Patent No.: US 7,206,974 B2
(45) Date of Patent: Apr. 17, 2007

(54) SYSTEM AND METHOD FOR MONITORING AND REPORTING EVENTS BETWEEN PERIPHERAL DEVICE AND HOST SYSTEM APPLICATIONS

(75) Inventors: Andrei Kozlov, Redmond, WA (US); David M. Shiflet, Redmond, WA (US); Lyman Cooper Partin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 10/427,148

(22) Filed: Apr. 30, 2003

(65) Prior Publication Data
US 2004/0221205 A1    Nov. 4, 2004

(51) Int. Cl.
*G06F 11/00* (2006.01)
(52) U.S. Cl. .......................... 714/44; 714/46
(58) Field of Classification Search ............ 714/5, 714/44, 46, 57
See application file for complete search history.

(56) References Cited

U.S. PATENT DOCUMENTS

| | | | |
|---|---|---|---|
| 6,612,759 B2 * | 9/2003 | Fukano et al. ............... 400/74 |
| 6,728,895 B1 * | 4/2004 | Nelson ............................. 714/4 |
| 6,754,855 B1 * | 6/2004 | Denninghoff et al. ......... 714/48 |
| 6,952,831 B1 * | 10/2005 | Moore ........................... 719/327 |
| 2002/0004852 A1 * | 1/2002 | Sadovsky et al. ............ 709/321 |
| 2002/0030847 A1 * | 3/2002 | Moriyama et al. ......... 358/1.15 |
| 2004/0064762 A1 * | 4/2004 | Deshpande et al. ............ 714/44 |

* cited by examiner

*Primary Examiner*—Scott Baderman
*Assistant Examiner*—Joshua Lohn
(74) *Attorney, Agent, or Firm*—Shook, Hardy & Bacon, L.L.P.

(57) ABSTRACT

The present invention is directed to a system and method for monitoring and reporting status and conditions during a data collection session between an application program and a peripheral device. The present invention provides a proxy service that filters communication bi-directionally and provides for a substitution of procedures in the event of a device related error. Through the substituted procedure any one of a number of error handlers can be utilized to notify a user of the error condition. Further still, after the error condition has been resolved, the data collection session can resume from where it left off rather than being completely restarted.

31 Claims, 5 Drawing Sheets

PROXY STATUS PROGRESSION

SYSTEM AND METHOD FOR MONITORING AND REPORTING EVENTS BETWEEN PERIPHERAL DEVICE AND HOST SYSTEM APPLICATIONS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to computing environments. More particularly, the invention is directed to a system and method for monitoring and reporting events between peripheral devices and host system applications. The present invention provides a user with the ability to resolve an error in communications with a peripheral device during communications between the device and an application program, without having to completely restart a data retrieval event.

BACKGROUND OF THE INVENTION

Computing systems are extremely prevalent today. They include a plethora of hardware and software components that originate from a wide variety of manufacturers. The need for efficient and consistent collaboration between these various components is essential to the success and usefulness of these computing systems. An operating system of a computing system provides the interface between user application programs and the underlying hardware or software components of the system.

Computer operating systems commonly incorporate features to communicate system and application information, to and from a variety of devices. These features are generally provided by multiple manufacturers. The growth of the computer industry has engendered a large number of companies to provide both hardware and software peripheral products for the market. In all of these cases, the operating system manufacturer has to ensure the compatibility and the exchange of data within and between the computer environment and any such hardware or software product. To ensure that the multitude of application programs that are executed on a computer system are able to effectively communicate with peripheral devices the operating system designers have developed interfaces that allow device-independent access. Two such interfaces are a device driver toolkit and Windows Imaging Acquisition (WIA) service.

Communications between the operating system and individual manufactures components are usually facilitated by customized software programs that function as a translator and are typically referred to as drivers. A driver provides an interface between proprietary manufacturer components and the operating system. The device driver toolkit provides Application Program Interfaces (API) and other tools needed by developers to write drivers for the operating system environment.

WIA service serves a similar purpose but includes a number of enhancements and features, the details of which are beyond the scope of this discussion. Suffice to say that WIA provides standard means for drivers and system components to provide device status and transfer error recovery user interface during data transfers to applications that support WIA.

The constant evolution of the computing industry and the advancement in technology results in changes to operating environments, operating systems, hardware devices and software components. The nature of these changes often necessitates a corresponding change or more appropriately an upgrade to the associated drivers that provide the interface between the new and the legacy technologies.

Drivers are typically designed and written by the operating system's manufacturer as well as by independent vendors and other third parties. By way of example only, an operating system such as the WINDOWS brand operating system from Microsoft in Redmond, Wash. includes a number of device drivers when sold. However, the vast majority of these drivers are actually released after the release of the operating system. In other words, the version of the driver that ships with the operating system is probably not the most recent version. Vendor fixes of defects are also delivered to end users, in the form of patches. In addition, new hardware products that are added to the client computing system require drivers to be installed. There are numerous drivers to support the vast array of available hardware products. For example, for one particular model of a hardware device such as a network interface card (NIC), the manufacturer could have various versions of the driver, each version directed to address different combinations of the NIC and the operating system. The same model of NIC could also have drivers that were developed by other third party vendors. In other words, there are multiple drivers and multiple sources for drivers that confront a user. Similarly, there are a vast number or application programs that are executed in computing environments. These application programs generally communicate to the various peripheral devices, using any one of the vast number of device drivers. As with all things, there are situations in which an error occurs on a device during one of such communications. A method for addressing these situations in a consistent manner across the variety of drivers and applications is needed.

Traditionally, the occurrence of an error results in the error condition being handled by the device driver and sometimes reported to the application program. When the error conditions are handled by the driver, the user experience becomes very device or manufacturer specific. The reporting of an error to the application program takes on many forms that can be driver and/or application specific. Applications need to be able to appropriately receive and respond to a wide variety of possible driver reactions to error conditions. In some instances, a Boolean value is provided to indicate that bad result data is being passed. In other instances, the application program simply receives no data and must then conclude that an error has occurred. In some rare circumstances, an error code or the like is transmitted to the application program, such as in the WIA paradigm. In either case the application program's response to the error condition generally results in a termination of the communication session. As can be appreciated, some error conditions are created by simple circumstances that can be easily rectified by the end user e.g., the document feeder in a scanner can become jammed. However, traditional systems provide no way of indicating, and having a user resolve, a fixable device error. Instead, the driver fails and the application has no way of determining the nature of the problem. As such, the application generally terminates communication and any data acquisition that was ongoing at the time of the error must be restarted from scratch. For example, while scanning twenty documents, if a paper jam failure occurs at document eleven, regardless of the fact that it is a fixable error, the user is required to start all over with document one.

Consequently, what is needed is a system and process for monitoring events that occur during communications between a peripheral device and application programs, in the operating environment. Further, such a system and process should report device status and problems, provide error recovery and only abort the process after giving a user the opportunity to first correct the problem. Even further, such a solution should be compatible with legacy applications and device drivers. Further still, an improved user experience is desirable. A user should be able to obtain meaningful information about error conditions and possibly rectify those errors without having to necessarily re-start any data acquisition process. All of these functions should be possible even when the error reporting user interface is not solely controlled by the device driver. Finally, this system and process should reduce user frustration and increase consistency in the handling of device errors.

BRIEF SUMMARY OF THE INVENTION

The present invention is directed to a system and method for use in a computing environment to monitor, present and provide events relating to communications between an application program and a peripheral device. During transfer from a peripheral device, the signal of an error by the driver offers an opportunity for presentment of the error to the user and an opportunity to fix the problem and resume transfer.

BRIEF DESCRIPTION OF THE SEVERAL VIEWS OF THE DRAWING

The present invention is described in detail below with reference to the attached drawings figures, wherein.

DETAILED DESCRIPTION OF THE INVENTION

The present invention is directed to a system and method for monitoring and reporting events between peripheral devices and host system application programs. The present invention enables a user to receive and act upon error information from a peripheral device, when the device is in communication with an application program. A user has the opportunity to possibly correct the source of the error, thus allowing the peripheral device to resume its operation with minimal, if any, interference to the communicating application program. For example, a word processing application may be in communication with a scanner. A user may be scanning in a document having ten pages. If an error occurs on the scanner such as a paper jam, during the scan of page seven, the user would be notified. The system and method of the present invention would not only allow that error to be reported to the user, but will give the user an opportunity to rectify the problem and proceed with the scanning process continuing from page seven. The word processing application would not have received a 'no data available' message, which would typically result in an abort of the scan process and thus require that scanning begin with page one after the problem is fixed.

Furthermore, the present invention also allows existing driver user interfaces to respond to error conditions, while shielding an application program from the accompanying interruption.

Having briefly provided an overview of the present invention, an embodiment of the invention will be discussed with reference to FIGS. 1–6. An exemplary operating environment for the present invention is described below.

Exemplary Operating Environment

Figure 1:
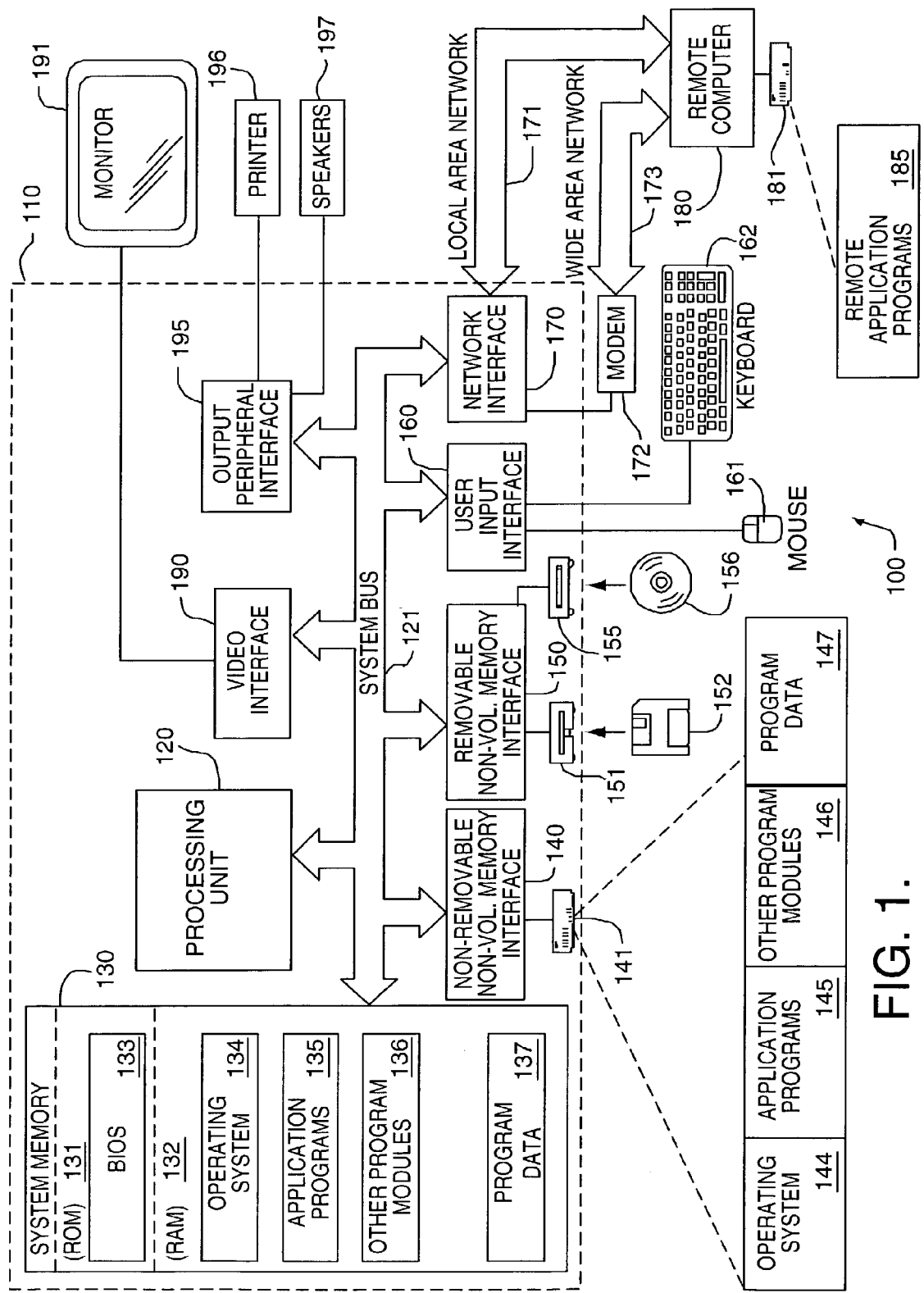
FIG. 1 is directed to an exemplary computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Event Monitoring and Reporting

As described earlier, conventional communication between an application program and a peripheral device is accomplished through a device driver. The present invention will be described with reference to an application program such as a word processor and a typical peripheral device that would provide data to the application, such as a scanner or camera. However, as would be understood by one skilled in the art, the present invention is not limited to this exemplary scenario. The components and process of this scenario are illustrated in the block diagram 200 of FIG. 2. As shown, an application program 202 communicates with a camera 214 to obtain some photographs. In accordance with the earlier discussion regarding devices from independent vendors and the use of device drivers, there is a device driver 208. The device driver 208 facilitates and enables the communication between the application program 202 and the camera 214.

In operation, application program 202 initiates a data request 204 to the device driver 208. The request is processed and packaged as appropriate, then sent to the camera 214 shown as 210. For example, such a request could be one seeking a collection of pictures that are stored on the camera 214. In response to the request, camera 214 may send a message 212 containing data or error conditions, to device driver 208. Traditionally, the device driver 208 will pass the information 206 along directly to the application program 202 regardless of the information.

In the case were the message 212 is data, the application program 202 proceeds and utilizes the information as needed. The application program 202 continues to receive data until it has the entire collection of pictures. However, in the case where the message 212 is an error condition, application program 202 receives the error and aborts the process of receiving pictures. At this point, a notification to the user if any at all, would be sketchy at best. Certainly, in the case where the notification is provided by the application program 202, there would be no details or suggestion of the cause or source of the error. If on the other hand, the driver 208 provides the notification, while the information may be detailed, the application program 202 is still left in a compromised state because it is without data and without any options. The application does not have sufficient data to prepare to receive the remaining parts of the image.

Figure 2:
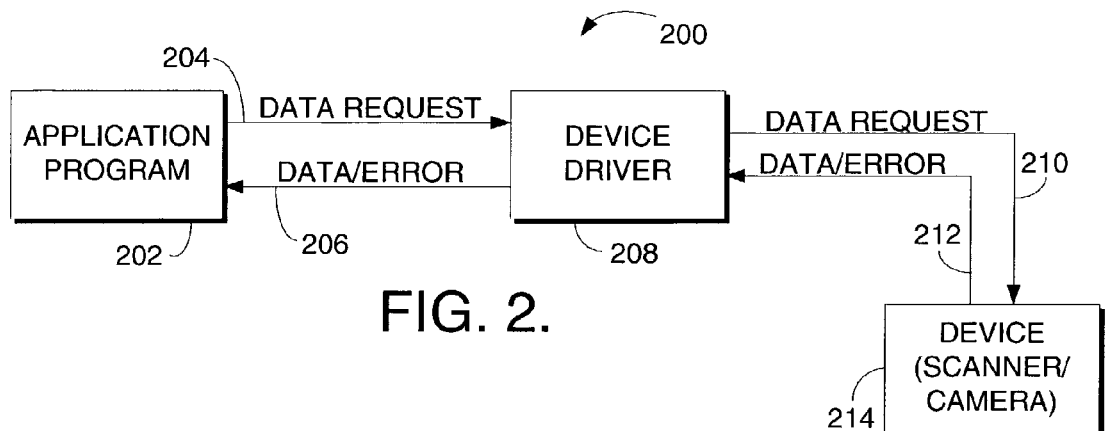
FIG. 2 is a block diagram illustrating typical communications between an application program and a device.
Figure 3:
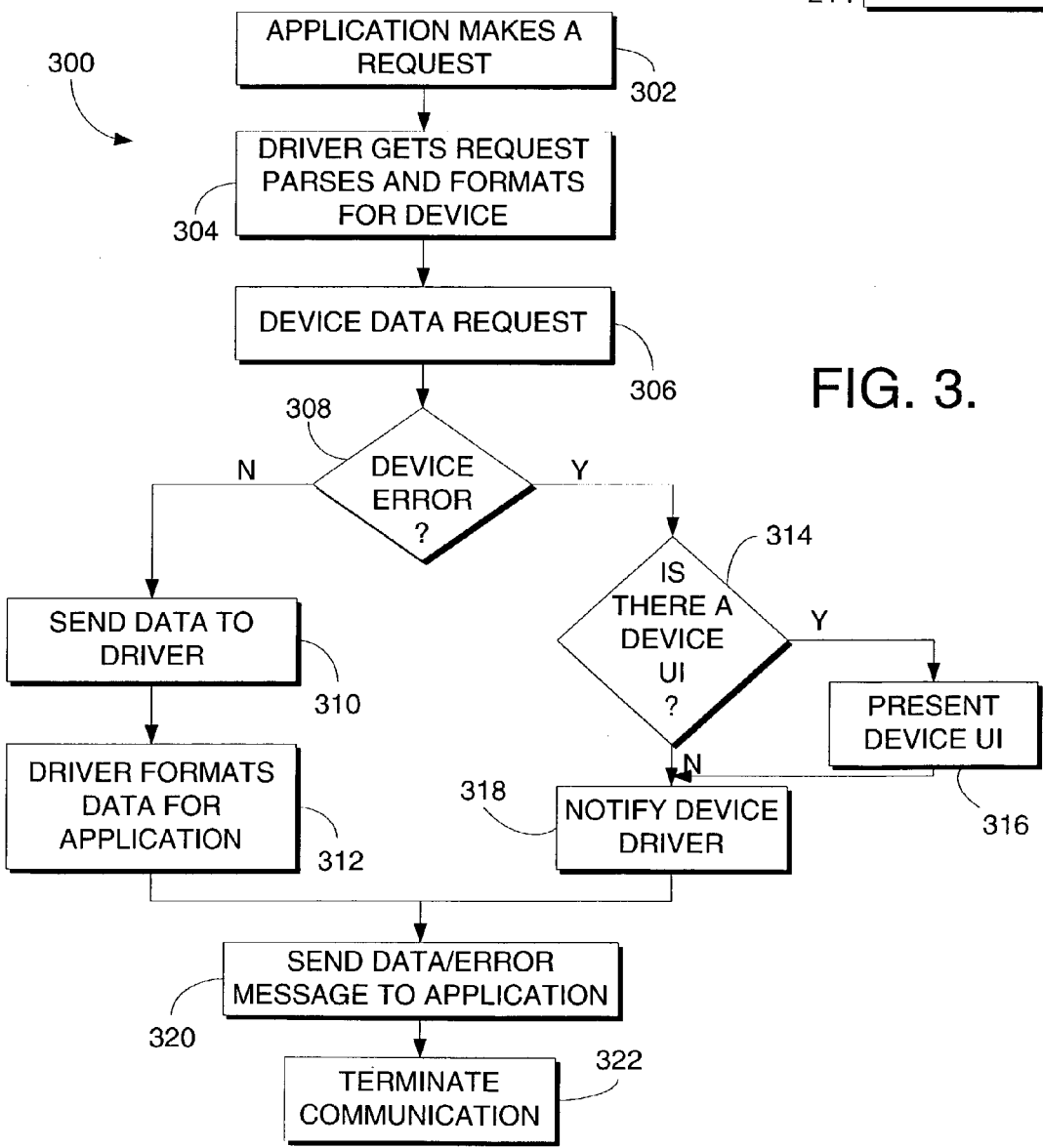
FIG. 3 is a flow diagram illustrating the conventional process of application and device communications.

The procedure associated with the components of the block diagram of FIG. 2 is illustrated in the flow diagram 300 of FIG. 3. At step 302, the application program 202 makes a data request. At step 304, the device driver 208 gets the request. The request is parsed and formatted for transmission to a device 214 in the form of a data request. The data request is submitted to the device 214, at step 306. At step 308, there is a check for a device error. In the event that there is no error, processing continues to step 310, where the requested data is sent to the driver 208. The driver 208 prepares the data in a format for application program 202, at step 312.

On the other hand, if at step 308 there is a device error, the device driver is provided with any information relevant to the error condition, at step 318. The driver then passes this information to the system.

Processing continues with the error message in the case of a device error or data in the case of no device error, being sent to the application 202, at step 320. Finally, the communication between the application program 202 and the device 214 is terminated, at step 322. Termination of the communication requires the user to restart whatever process was being executed and begin the data request from scratch.

Figure 4A:
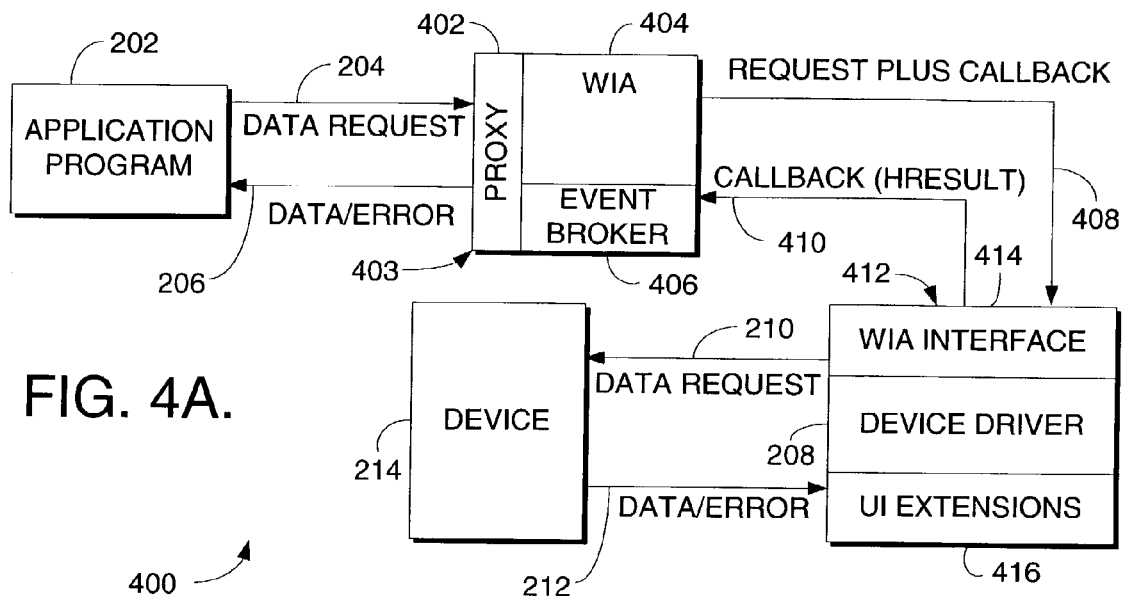
FIG. 4A is a block diagram illustrating communications between an application program and a device according to the present invention.
Figure 4B:
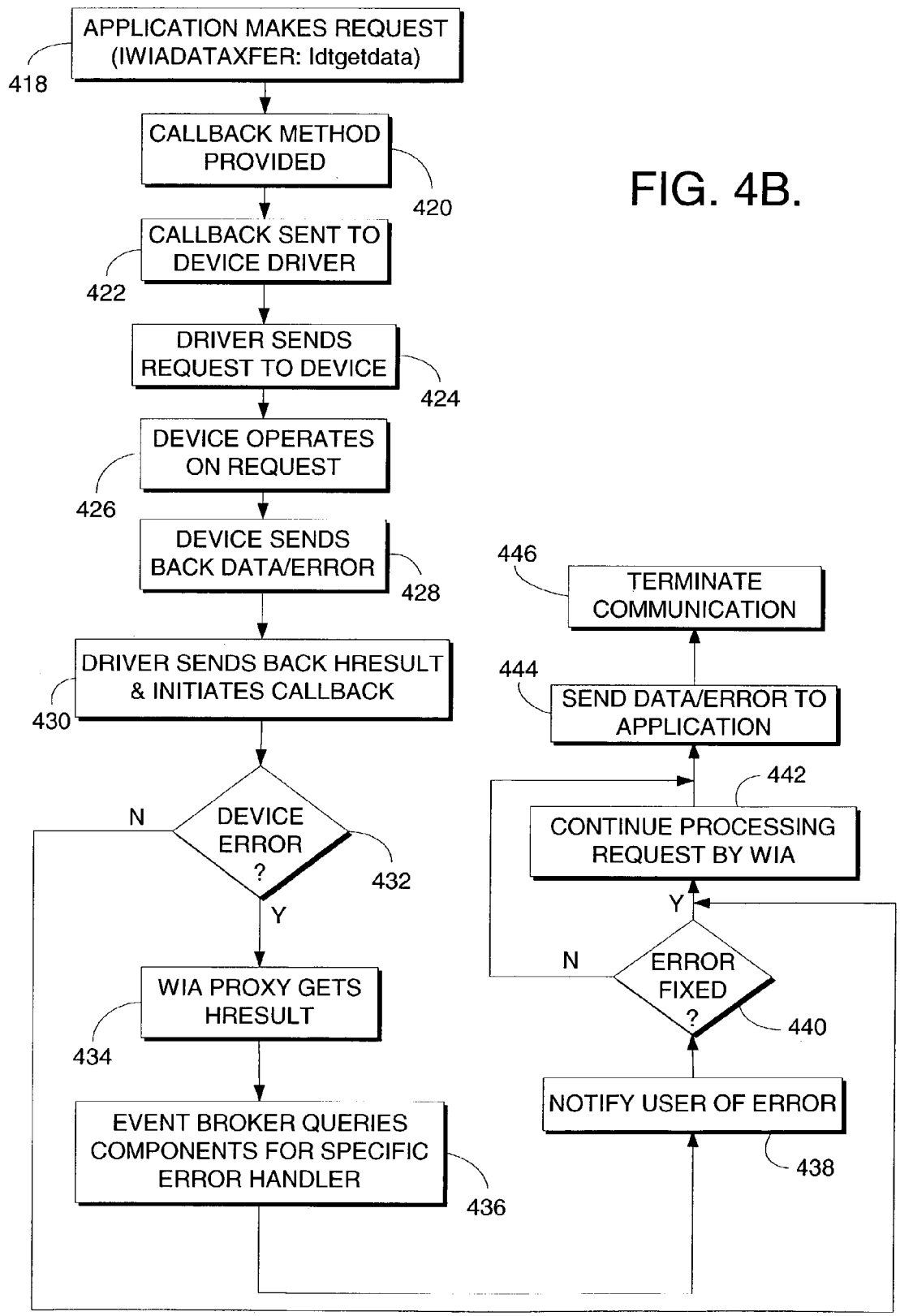
FIG. 4B is a flow diagram illustrating the method of the present invention.

The present invention provides a solution that avoids these and other problems relating to communications with peripheral devices. A block diagram of some exemplary components for implementing the system and method of the present invention is illustrated in FIG. 4A. The process performed by those components is illustrated in FIG. 4B.

As previously explained with reference to FIG. 2, the system of the present invention also includes an application program 202, application data request 204, application response data or error 206, a driver data request 210 and driver response data or error 212, a device driver 208 and a device 214. Located between the application program 202 and the device 214 are a Windows Image Acquisition (WIA) driver 412 and an error recovery component 403.

Error recovery component 403 includes a proxy service 402, a WIA service 404 and an event broker 406. Proxy service 402 traps messages intended for the application program, determines the nature of the message and substitutes a different procedure to process the message. Event broker 406 offers opportunities for one of several user interfaces to inform a user of an error condition so that it can be fixed.

WIA driver 412 includes a device driver 208, a WIA interface 414 and UI extensions 416. WIA interface 414 provides the necessary extensions for the device driver 208 to communicate with the WIA service 404. UI extension 416 enables the driver 208 to present information and potentially receive input from a user regarding the status of the device 214.

In operation, application program 202 makes a data request 204, which passes through error recovery component 403 and WIA driver 412 to get to device 214. Responses from the device 214 also pass through the same components in reverse order, to reach the application program. In combination, error recovery component 403 and WIA driver 412 enable the trapping and handling of errors in a manner that is non-disruptive to the application program 202. These components allow a user to respond to and rectify an error message without causing the application program 202 to restart data acquisition from the device 214. An exemplary embodiment illustrating this process will be discussed with reference to FIG. 4B.

As shown in FIG. 4B, the application program 202 makes a data request 204, at step 418. The request is received by proxy 402, which then provides a callback method, at step 420. A callback method provides a pointer to a method or routine that will be executed when a response to the data request is received by error recovery component 403. The data request including the callback method 408 is sent to the WIA driver 412, at step 422. WIA driver 412 processes a request 210, which is then sent to the device 214, at step 424.

The device 214 operates on the request at step 426 and responds with data/error 212 in a message back to WIA driver 412, at step 428. Data/error 212, otherwise referred to as resultant information, (Hresult), is passed back as a parameter when the callback method is initiated, at step 430. The callback method essentially receives from the driver data or error items, as the case may be. This is illustrated at step 432. The resultant information from device 214, designated as HResult is passed to the callback method.

At step 432, if a device error occurs, control passes on to step 434. Conversely, if there is no device error, processing continues at step 442.

The proxy 402 also gets a copy of Hresult, at step 434. With HResult, proxy 402 is able to query for a specific error handler. Event broker 406 works in conjunction with proxy 402 to obtain the right error handling routine. The details of the various error routines will be discussed later in this document. Regardless of the utilized error handler, the user is ultimately notified of the error condition, at step 438. Notably, notification to the user does not involve a notification to the application program 202, hence there is no immediate interruption to the processing of the application data request.

Instead, a user has the opportunity to fix the problem, at step 440. If the problem cannot be resolved by the user, processing proceeds to step 444, wherein the error message is then sent to the application program 202. However, if the user can resolve the problem, processing of the request continues, and the device 214 proceeds with request right where it left off. Data or error information is sent to the application, at step 444. When the application receives either the requested data or an error notification at step 444, the communication process is terminated at step 446. Error recovery as provided by error component 403 and the WIA driver 412 as described herein allow notification and correction of problems mid-transfer. The details of how this works will be discussed next with reference to FIG. 5.

Figure 5:
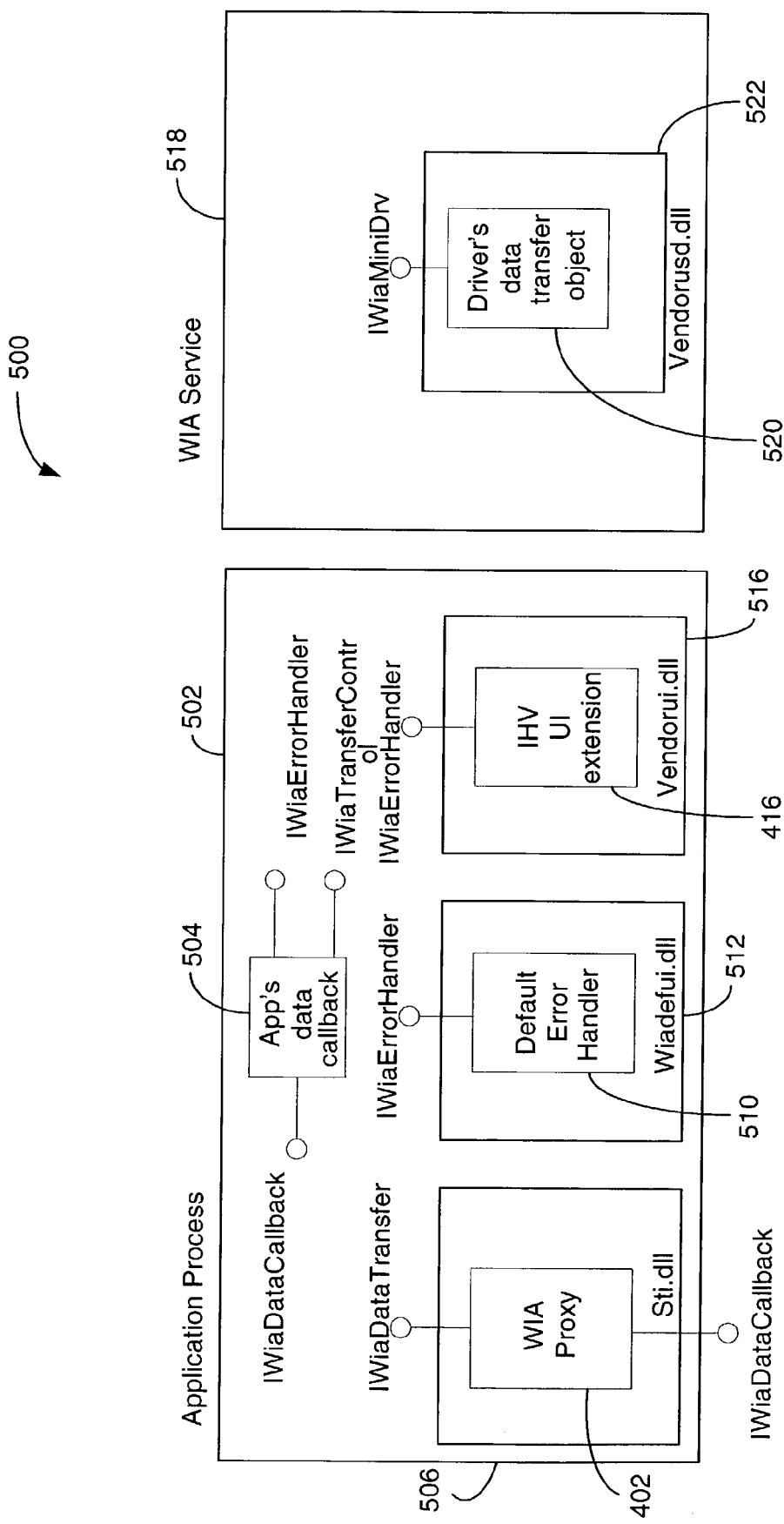
FIG. 5 is a block diagram illustrating components of the present invention utilized in the illustrated communication of FIG. 4.

Display 500 of FIG. 5 illustrates various components of an embodiment of the present invention. In particular, display 500 illustrates the specific component modules that perform the functions of the present invention as described in the block diagram of FIG. 4A and process flow of FIG. 4B. Returning to FIG. 5, conceptually the processing of the present invention includes an application process 502 and WIA service 518, which in combination provide the features of the present invention. Each of these processing components include several methods, objects and sub-components, of which only a relevant few are shown. For example, there is an application callback method 504, which is called by a synonymous method of the proxy 402. There are system components, IHV components and Independent Software Vendor (ISV) components. Within these components, there are four dynamic link libraries (dll) that enable the functions discussed herein. The DLLs are grouped as follows: sti.dll 506, wiadefui.dll 512 and vendorui.dll 516, are part of the application process 502 while vendorus.dll 522 is a part of the WIA service 518. STI.dll 506 and Wiadefui.dll 512 are operating system components while vendorui.dll and vendorusd.dll are IHV components. WIA service 518 is provided by the system and the application process 502 is provided by an ISV.

For each of the displayed components, the calling methods are also displayed. For example, WIA proxy 506 is called by IWiaDataTransfer and IWiaDataCallback, default error handler 510 is called by IWiaError handler, and so on.

Within Sti.dll 506 is the WIA proxy 402. As discussed earlier with reference to FIG. 4A, WIA proxy 402 receives the application program's data request. In an embodiment of the present invention, the data request is made by calling IWiaDataTransfer::idtGetData. This call is intercepted by the WIA proxy 402, which passes in IWiaDataCallback::ImageDataCallback method, with HResult as one of its parameters. IWiaDataCallback::ImageDataCallback is provided as a substitute to the callback method of the application program. As previously explained, the purpose of the substitution is to enable the proxy 402 to intervene and prevent error messages from reaching the application program before the user is given a chance to fix the error.

In other words, the proxy's callback method gets executed by the WIA service instead of the application's callback method. As a result, the proxy's callback method can implement functions and procedures to which the application callback method would be oblivious. In an embodiment of the present invention, the proxy's callback method detects the presence of an error, and based upon the error condition, it initiates procedures to enable user intervention. When the proxy object receives the error, there is a query to find an implementation of IWiaErrorHandler, that will handle the error. The error handlers are checked in a particular order as follows: the application's data callback object 504, the driver's registered UI extension 416, and the default handler 510 found in wiadefui.dll.

Figure 6:
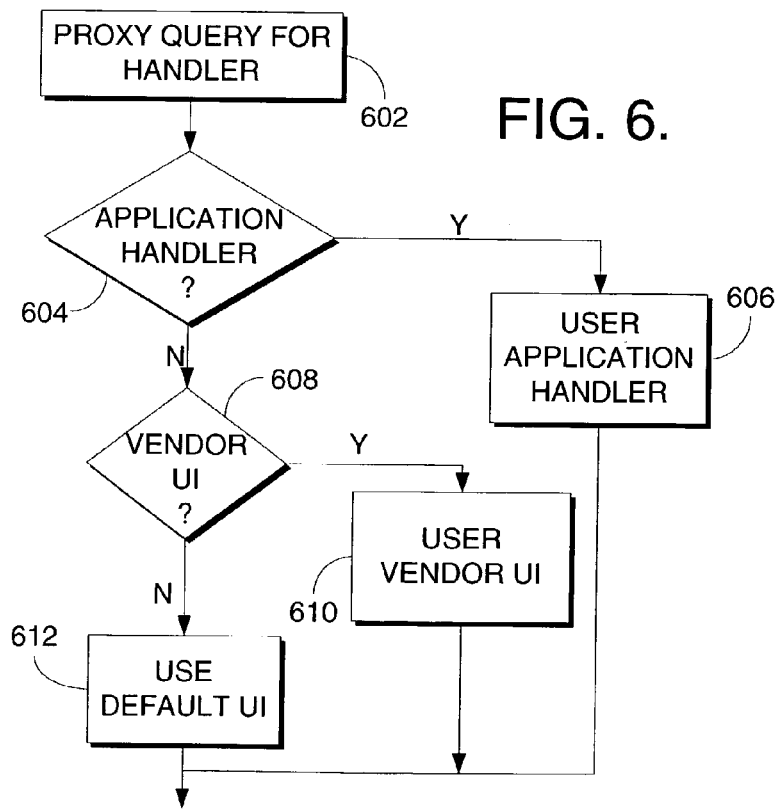
FIG. 6 illustrates the process of a status progression performed by the proxy module of the present invention.

The progression of IWiaErrorHandler is illustrated in the flow diagram of FIG. 6. When a device 214 encounters an error during a transfer, there is a status message (IT_MSG_DEVICE_STATUS) that is passed to IWiaDataCallback::ImageDataCallback method. The status message prompts a proxy query for an error handler at step 602. This query is handled by the event broker 406 of FIG. 4A as previously discussed. Through the event broker 406, the method of the present invention first attempts to locate an error handler for the application program, if one is available, at step 604 of FIG. 6. If an application error handler exists, then it is utilized to both display and respond to the error, at step 606. On the other hand, if one does not exist, there is a search for a vendor provided error handler, such as IHV UI extension 416 of FIG. 5, at step 608 of FIG. 6. If found, the vendor supplied handler is utilized at step 610. If a vendor supplied handler is not found, a default error handler such as default error handler 510 of FIG. 5 is utilized at step 612. The handling of the error is transparent to the calling application program and the device that generated the error condition.

As discussed, through this process of handling error events, the system and method of the present invention enables a user to monitor and correct certain errors. These errors are corrected during an ongoing data acquisition session and eliminates the need to restart the collection process from scratch.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set for above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method in a computing environment for monitoring and reporting events during a communication session between a peripheral device and a computing device having an application program thereon, comprising:
    utilizing an image acquisition service on the computing device to monitor for one or more error conditions in communications between the peripheral device and the application program;
    presenting the one or more error conditions to a user;
    presenting to the user an opportunity to fix the one or more error condition; and
    resuming the communication session after the one or more error conditions has been fixed by the user without requiring a restart of the communication session.

2. A method as recited in claim 1, wherein the communication session involves the transfer of one or more data items from the peripheral device to the application program.

3. A method as recited in claim 2, wherein said one or more data items are digital photographs.

4. A method as recited in claim 3, wherein the resumption of the communication session is continued transfer of subsequent digital photographs after the one or more error conditions occurred during the transfer of an initial one or more digital photographs.

5. A method as recited in claim 2, wherein said one or more data items are scanned document pages.

6. A method as recited in claim 5, wherein the resumption of the communication session is continued transfer of subsequent document pages after the one or more error conditions occurred during the transfer of an initial one or more document pages.

7. A method as recited in claim 2, wherein said one or more data items are portions of digital media files.

8. A method as recited in claim 1, wherein presenting the one or more error conditions is provided by a user interface of a proxy service.

9. A method as recited in claim 1, wherein presenting the one or more error conditions is provided by a user interface of a device driver.

10. A method in a computing system for providing continuity in a communication process between a peripheral device and a computing device having an application program thereon, comprising:
    intercepting a communication message between the application program and a device driver;
    utilizing an image acquisition service on the computing device to monitor for one or more error conditions in the communication message;
    presenting the one or more error conditions to a user;
    presenting to the user an opportunity to fix the one or more error conditions; and
    providing a procedure to allow the user to fix the one or more errors conditions without terminating the communication process.

11. A method as recited in claim 10, wherein said procedure includes notifying the user of device status.

12. A method in a computing system for monitoring and reporting events between a peripheral device and a computing device having an application program thereon, comprising:
    receiving from the application program, a request for data from the device;

receiving information from the device in response to said request;

utilizing an image acquisition service on the computing device to monitor the information for a device error;

locating an error handler if the received information is related to the device error;

presenting to the user an opportunity to fix the device error;

notifying a user of said device error; presenting to the user an opportunity to fix the device error; and determining if the device error has been resolved by the user and thereafter continuing to process the data request without interruption to the application program.

13. A method as recited in claim 12, wherein said step of receiving a request for data comprises:

receiving an identification of a first callback method in addition to said data request;

substituting said first callback method identification with an identification of a second callback method; and executing said second callback method upon receipt of a response to said data request.

14. A method as recited in claim 13, wherein said second call back method invokes a query to locate an error handler if said response to said data request is an error condition.

15. A computer readable medium having computer executable instructions for performing a method in a computing system for monitoring and reporting events during a communication session between a peripheral device and a computing device having an application program thereon, the method comprising:

utilizing an image acquisition service on the computing device to monitor communications between the peripheral device and the application program for error condition;

presenting a detected error condition to a user;

presenting to the user an opportunity to fix said detected error condition; and resuming the communication session after said detected error condition has been fixed by the user without requiring a restart of the communication session.

16. A computer readable medium as recited in claim 15, wherein the communication session involves the transfer of one or more data items from the peripheral device to the application program.

17. A computer readable medium as recited in claim 16, wherein said one or more data items are photographs.

18. A computer readable medium as recited in claim 17, wherein the resumption of the communication session is continued transfer of subsequent photographs after said detected error condition occurred during the transfer of an initial one or more photographs.

19. A computer readable medium as recited in claim 16, wherein said one or more data items are scanned document pages.

20. A computer readable medium as recited in claim 19, wherein the resumption of the communication session is continued transfer of subsequent document pages after said detected error condition occurred during the transfer of an initial one or more document pages.

21. A computer readable medium as recited in claim 16, wherein said one or more data items are portions of digital media files.

22. A computer readable medium as recited in claim 15, wherein presenting said detected error condition is provided by a user interface of a proxy service.

23. A computer readable medium as recited in claim 15, wherein presenting said detected error condition is provided by a user interface of a device driver.

24. A computing system having computer executable instructions for providing continuity in the communication process between a peripheral device and a computing device having an application program thereon, the instructions comprising:

intercepting communication messages between the application program and a device driver;

utilizing an image acquisition service on the computing device to monitor the communication message for device errors;

presenting a detected error condition to a user;

presenting to the user an opportunity to fix the detected error condition; and providing a procedure to allow the user to fix the device error condition without terminating the communication process.

25. A method as recited in claim 24, wherein said procedure includes notifying a user of the status of the device.

26. A method as recited in claim 24, wherein said procedure includes allowing the error condition to be fixed and resuming the communication between the device and the application program without requiring a restart of the communication session.

27. A computer readable medium having computer executable instructions for performing a method in a computing system for monitoring and reporting events between a peripheral device and a computing device having an application program thereon, the method comprising:

receiving from the application program, a request for data from the device;

receiving information from the device in response to said request;

utilizing an image acquisition service on the computing device to monitor for a device error;

locating an error handler if the received information is related to said device error;

notifying a user of said device error;

presenting to the user an opportunity to fix said device error; and determining if said device error has been resolved by the user and thereafter continuing to process the data request without interruption to the application program.

28. The computer readable medium of claim 27, wherein said step of receiving a request for data comprises:

receiving an identification of a first callback method in addition to said data request;

substituting said first callback method identification with an identification of a second callback method; and executing said second callback method upon receipt of a response to said data request.

29. The computer readable medium of claim 28, wherein said second call back method invokes a query to locate an error handler if said response to said data request is an error condition.

30. A system for providing continuity in the communication process between a peripheral device and a computing device having an application program thereon, comprising:

a device driver to receive input from a user to fix a device error;

an event broker, wherein the event broker utilizes a user interface to present the device error to the user; and a proxy service comprising an image acquisition service on the computing device, wherein the image acquisition service intercepts communication messages between the application program and the device driver to monitor for error conditions from the device, wherein the proxy service utilizes the event broker to provide an alternate procedure to handle the error conditions and prevent interruption to the application program.

31. A computing system for performing a method in a computing system monitoring and reporting events during a communication session between a peripheral device and a computing device having an application program thereon, the method comprising:

filtering communications between the peripheral device and the application program;

utilizing an image acquisition service on the computing device to monitor for one or more error conditions in the communication message;

presenting a user with the one or more error conditions;

presenting to the user an opportunity to fix the one or more error conditions; and resuming the communication session after the one or more error conditions have been fixed by the user without requiring a restart of the communication session.

* * * * *